(12) United States Patent
D'herbemont et al.

(10) Patent No.: US 7,126,932 B2
(45) Date of Patent: *Oct. 24, 2006

(54) USER EQUIPMENT DEVICE FOR A UMTS MOBILE TELEPHONE COMMUNICATIONS SYSTEM

(75) Inventors: Luc D'herbemont, Paris (FR); Thierry Garcin, Paris (FR); Francois Gouere, Jouars Pontchartrain (FR); Michael Roberts, Neuilly sur Seine (FR)

(73) Assignee: Lucent Technologies Inc., Murray Hill, NJ (US)

( * ) Notice: Subject to any disclaimer, the term of this patent is extended or adjusted under 35 U.S.C. 154(b) by 988 days.

This patent is subject to a terminal disclaimer.

(21) Appl. No.: 10/075,844

(22) Filed: Feb. 13, 2002

(65) Prior Publication Data

US 2002/0115470 A1 Aug. 22, 2002

(30) Foreign Application Priority Data

Feb. 16, 2001 (EP) ................................ 01301345

(51) Int. Cl.
*H04Q 7/24* (2006.01)
(52) U.S. Cl. ........................................ 370/338; 370/352
(58) Field of Classification Search .............. 370/46 B, 370/389, 465, 466, 350, 328, 351, 352, 338, 370/356; 455/560, 458, 517
See application file for complete search history.

(56) References Cited

U.S. PATENT DOCUMENTS

| 6,738,632 | B1 * | 5/2004 | D'herbemont et al. ...... 455/458 |
| 2002/0151304 | A1 * | 10/2002 | Hogan ........................ 455/436 |
| 2003/0050097 | A1 * | 3/2003 | Amirijoo et al. ........... 455/560 |

FOREIGN PATENT DOCUMENTS

| KR | 2000-66660 | 11/2000 |
| WO | WO 99/52317 | 10/1999 |

OTHER PUBLICATIONS

Universal Mobile Telecommunications System—XP002168551, Dec. 2000, ESTI.

* cited by examiner

*Primary Examiner*—Ajit Patel

(57) ABSTRACT

The present invention relates to a user equipment device of a UMTS (Universal Mobile Telephone System) type mobile radio telecommunications system. The user equipment device (UE) works selectively in two modes of operation, a connected mode in which resources of the system are allocated to setting up a connection with the user equipment device and an idle mode. The user equipment device is identified in idle mode by a first identity (IMSI; TMSI; PTMSI) and in connected mode by a second identity. According to the invention, the user equipment device in connected mode is capable of processing messages in which it is identified by its first identity (IMSI; TMSI; PTMSI).

5 Claims, 2 Drawing Sheets

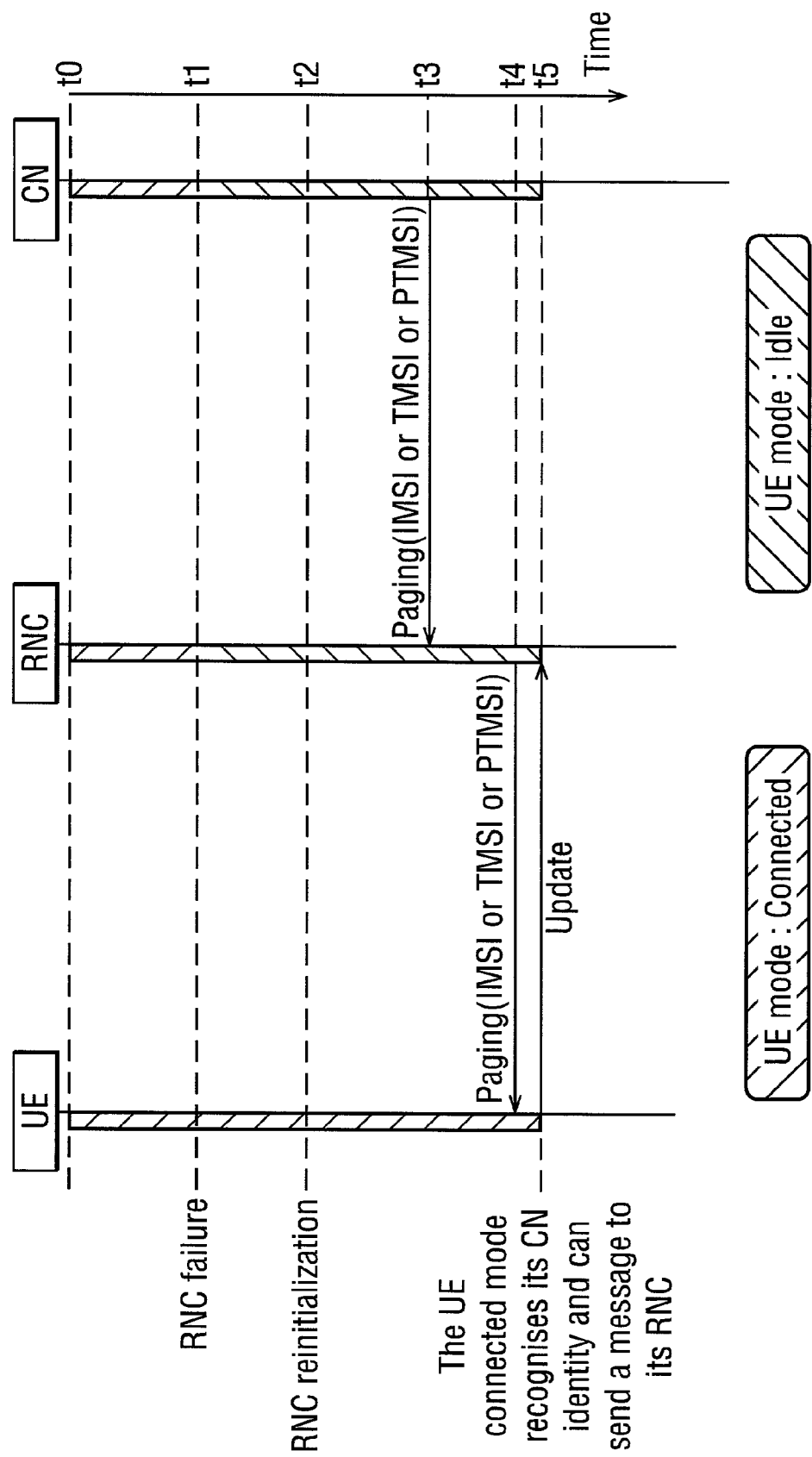

USER EQUIPMENT DEVICE FOR A UMTS MOBILE TELEPHONE COMMUNICATIONS SYSTEM

BACKGROUND OF THE INVENTION

I. Field of the Invention

The present invention relates to a UMTS (Universal Mobile Telephone System) type mobile radio telecommunications system.

II. Description of the Related Art

A UMTS type system consists of a UTRAN (Universal Terrestrial Radio Access Network) type of network, mobile terminals, commonly known as user equipment (UE) devices, and a core network connected to the public switched telephone network and the Internet. A system of this kind is illustrated in FIG. 1. The UTRAN network consists of a set of radio network sub-systems RNS connected to the core network by means of an interface Iu. Each radio network sub-system RNS consists of a radio network controller RNC controlling a set of logic elements, known as Node B, by means of an interface Iub. The radio network controllers RNC are connected to each other by an interface Iur. Each Node B serves one or more cells of the network. Finally, each user equipment device UE is connected to one or more Node Bs through a radio interface Uu.

In the example of FIG. 1, the UTRAN network comprises three radio network controllers referenced RNC1, RNC2, and RNC3 and each of these radio network controllers controls two Node Bs. Four user equipment devices UE1, UE2, UE3 and UE4 are connected to these Node Bs.

The user equipment devices have two modes of operation: an idle mode and a connected mode. During the idle mode, no system resource is specifically allocated to the conveyance of data to and from the user equipment device. The user equipment device is in idle mode for example after it is powered on. In this mode, each user equipment device is identified by a core network identity which may be either the IMSI (International Mobile Subscriber Identity) of the user equipment device (which is transmitted to the core network during the first connection of the user equipment device to the UMTS system) or a TMSI (Temporary Mobile Subscriber Identity) for a circuit switch service or a PTMSI (Packet Temporary Mobile Subscriber Identity) for a packet switch service.

The user equipment device passes into connected mode when there is a request for making a connection to the system. Thus, as soon as information has to be transmitted to a user equipment device in idle mode, the core network uses the UTRAN network to send a paging message to the user equipment device concerned to ask it to pass into connected mode.

In connected mode, the user equipment device may take four states known as mobility states:

Cell_DCH for Cell Dedicated Channel;
Cell_FACH for Cell Forward Access Channel;
URA_PCH for UTRAN Registration Area Paging Channel;
Cell_PCH for Cell Paging Channel.

These four mobility states are described in detail in the radio access network group technical specification "3GPP TS 25.331 V3.5.0", section 7, pages 30–32 and Appendix B, pages 615–622, updated in December 2000.

In brief, in the four mobility states of the connected mode, system resources are allocated to the transmission of data in the uplink and/or in the downlink. These radio resources may or may not be shared among several user equipment devices.

In connected mode, the user equipment devices are identified by a URNTI (UTRAN Radio Network Temporary Identity) allocated by one of the Serving Radio Network Controllers (SRNC). The serving radio network controller of a user equipment device in connected mode corresponds to the radio network controller that is linked with the core network for the connection considered. For example, if we consider in FIG. 1 that the user equipment device UE3 transmits data to the core network by passing first of all through the radio network controller RNC2 and then through the radio network controller RNC1, the latter is the serving radio network controller associated with the user equipment device UE3.

In the event of the failure of one of the radio network controllers leading to a break in the connections Iu between this radio network controller and the core network and the loss of all or part of the data pertaining to the user equipment device, for example the URNTIs, all the user equipment devices having this radio network controller as the serving radio network controller are perceived by the core network as being in the idle mode. It must be noted that, when the defective radio network controller starts working properly again, it also perceives all the user equipment devices as being in idle mode. If the core network tries to set up a connection with these user equipment devices to send them data, the radio network controller will try to establish a connection using their core network identity. Since the user equipment devices are in connected mode, they will be unaware of these attempts to make connection. All these user equipment devices are therefore inaccessible until they themselves make their presence known to the network for example by an updating operation. This period of non-accessibility of the user equipment device may be very lengthy and may last several hours.

At present, the only solution to this problem lies in sending paging messages by testing all the URNTIs possible in order to connect with all the user equipment devices in connected mode having one of these identities and ask them to make their presence known to the network. This approach is not very satisfactory because it is very costly in terms of system resources (in paging channel PCH) and in time. Indeed, there may be more than 100,000 user equipment devices connected to each radio network controller.

SUMMARY OF THE INVENTION

Thus, it is an aim of the invention to find an approach to limit this period of non-accessibility of user equipment devices to the utmost possible extent.

An object of the invention therefore is a user equipment device of a mobile radio telecommunications system, said user equipment device working selectively in two modes of operation, a connected mode in which resources of the system are allocated to setting up a connection with the user equipment device and an idle mode, said user equipment device being identified in idle mode by a first identity and in connected mode by a second identity, characterized in that the user equipment device in connected mode is capable of processing messages in which it is identified by its first identity.

BRIEF DESCRIPTION OF THE DRAWINGS

This characteristic and the advantages of the invention shall appear more clearly from the following detailed description which is made with reference to the appended drawings, of which:

FIG. 2 illustrates the working of a user equipment device according to the invention following a failure of a radio network controller.

DETAILED DESCRIPTION

Figure 1:
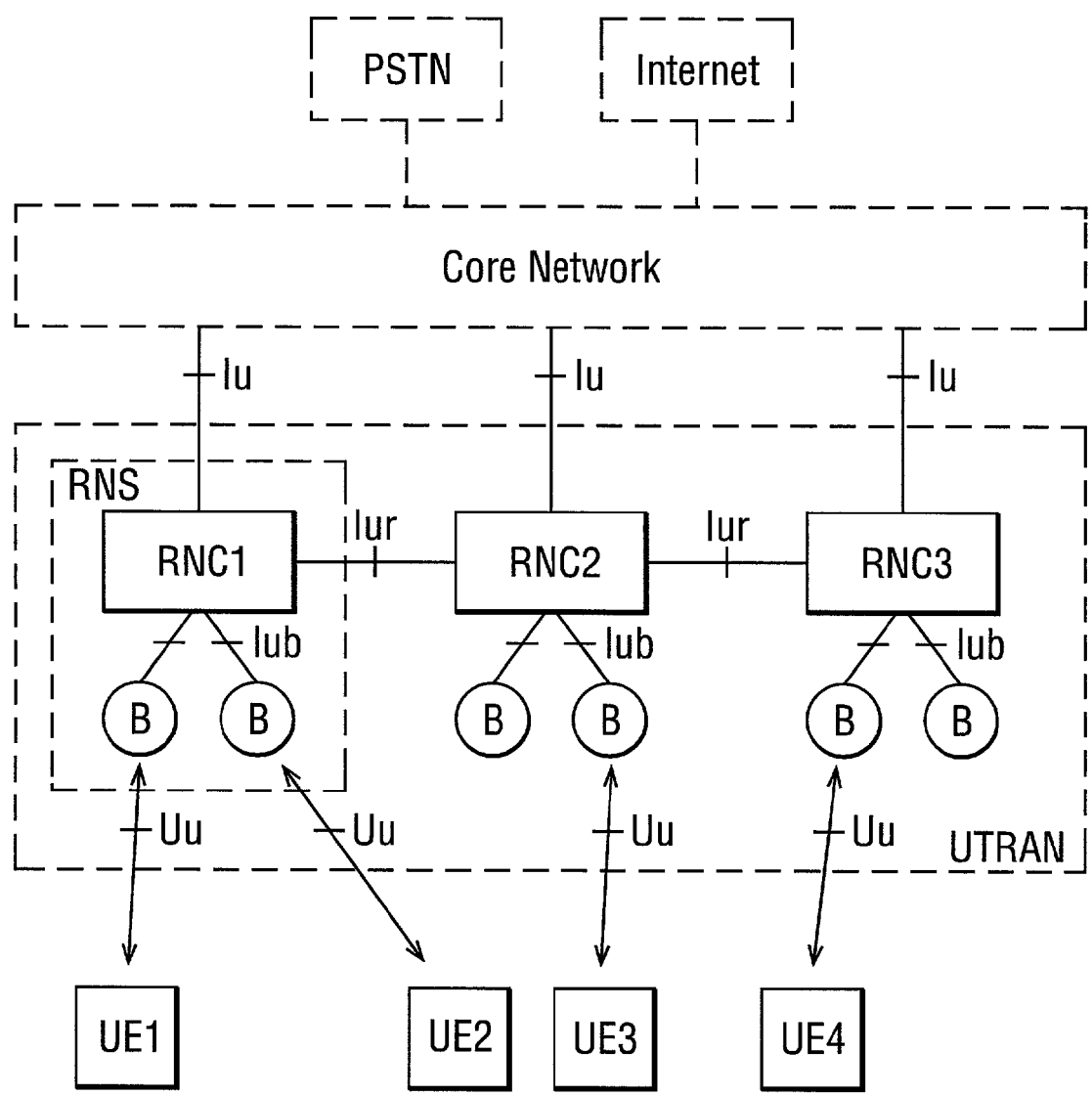
FIG. 1, which has already been described, shows the standard architecture of a UMTS system.

According to the invention, each user equipment device of the system in connected mode is capable of processing the messages in which it is identified by its core network identity.

FIG. 2 considers a user equipment device UE in connected mode linked by radio with a radio network sub-system comprising a radio network controller RNC. This radio network sub-system is linked with the core network CN of the system. In the core network, the user equipment device is identified either by its IMSI or by its TMSI for a circuit switch service, or by a PTMSI for a packet switch service.

As an alternative embodiment, the user equipment device may be identified in the core network by an identity used in any type of public land mobile network, for example a GSM-MAP network or a DS-41 network.

At the time t0, the user equipment is perceived by the radio network sub-system RNS and the core network CN as being in connected mode.

At the time t1, a failure occurs in the radio network controller RNC. This RNC is put back into operation and reinitialized at the time t2. The user equipment device UE is then perceived by the radio network controller RNC and the core network CN as being in idle mode when it is actually in connected mode.

At the time t3, the core network CN sends a paging message to the UTRAN network to reinitialize a data transmission operation. In this message, the user equipment device is identified by one of its core network identities, namely IMSI, TMSI or PTMSI.

For the UTRAN network, the user equipment UE is in idle mode. It therefore sends the user equipment device the paging message at the time t4 without converting the core network identity contained in this message into a URNTI.

According to the invention, the user equipment device UE in connected mode recognizes its core network identity in this message and will therefore process this message. In response to this message, the user equipment device UE will for example send an update message to the UTRAN network to inform it that it is in connected mode.

Assuming that all or part of the parameters of the connection between the user equipment UE and the core network set up before the failure of the radio network controller RNC have been lost during this failure, the UTRAN network may ask the user equipment device UE to go back into idle mode.

The invention claimed is:

1. A user equipment device of a mobile radio telecommunications system, said user equipment device working selectively in two modes of operation, a connected mode in which resources of the system are allocated to setting up a connection with the user equipment device and an idle mode, said user equipment device being identified in idle mode by a first identity and in connected mode by a second identity, wherein the user equipment device in connected mode processes messages in which said user equipment device is identified by said first identity.

2. The user equipment device according to claim 1, wherein said first identity of the user equipment is an international mobile subscriber identity or a temporary mobile subscriber identity for a circuit switch service or a packet temporary mobile subscriber identity.

3. The user equipment device according to claim 1, wherein said second identity is a UTRAN network temporary identity.

4. The user equipment device according to claim 1, wherein said first identity of the user equipment is an identity applicable in any type of public land mobile network.

5. The user equipment device according to claim 1, wherein said first identity of the user equipment is an identity applicable in a GSM-MAP or DS-41 public land mobile network.

* * * * *